United States Patent
Vongkulbhisal et al.

(10) Patent No.: US 11,042,756 B1
(45) Date of Patent: Jun. 22, 2021

(54) SEMI-SUPERVISED GROUPING AND CLASSIFYING GROUPS FROM IMAGES

(71) Applicant: INTERNATIONAL BUSINESS MACHINES CORPORATION, Armonk, NY (US)

(72) Inventors: Jayakorn Vongkulbhisal, Tokyo (JP); Tatsuya Ishihara, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/786,628

(22) Filed: Feb. 10, 2020

(51) Int. Cl.
*G06T 13/40* (2011.01)
*G06K 9/00* (2006.01)
(Continued)

(52) U.S. Cl.
CPC ......... *G06K 9/00778* (2013.01); *G06F 17/16* (2013.01); *G06N 3/08* (2013.01);
(Continued)

(58) Field of Classification Search
CPC .......... G06N 20/00; G06N 3/08; G06N 7/005; G06N 3/0454; G06T 13/40; G06T 2207/20084; G06T 7/246; G06T 2207/30196; G06T 7/70; G06K 9/00771; G06K 9/00335; G06K 2009/3291; G06K 9/00369; G06K 9/32; G06K 9/00711; G06K 9/00624; G06K 9/4604; G06K 9/6215; G06K 9/6218; G06K 9/00362;
(Continued)

(56) References Cited

U.S. PATENT DOCUMENTS

| 9,582,762 | B1* | 2/2017 | Cosic | G06N 3/006 |
| 2004/0143602 | A1* | 7/2004 | Ruiz | H04N 7/181 |
| 2015/0213702 | A1* | 7/2015 | Kimmel | G06T 7/20 |
| | | | | 382/103 |

FOREIGN PATENT DOCUMENTS

| CN | 110175528 | 8/2019 |
| GB | 2505501 | 3/2014 |

OTHER PUBLICATIONS

Mell et al. "The NIST Definition of Cloud Computing", NIST Special Publication 800-145, 2011, 7 pages.
Del Pizzo, et al., "Counting people by RGB or depth overhead cameras", ELSEVIER, Pattern Recognition Letters 81 Jun. 2016, pp. 41-50.
(Continued)

*Primary Examiner* — Quan M Hua
(74) *Attorney, Agent, or Firm* — Tutunjian & Bitetto, P.C.; Randall Bluestone (57) ABSTRACT

A semi-supervised computer-implemented method for group and group activity detection is provided. The method includes detecting, by a hardware processor, entity areas in an image. The method further includes extracting relative position features from pairs of the entity areas. The method also includes extracting pixel features from the pairs of the entity areas. The method additionally includes combining the relative position features and the pixel features to generate edge features. The method further includes identifying, using a display device, groups formed from the entity areas by processing the edge features using an Edge-Labeling Graph Neural Network. The method also includes identifying, using the display device, for each of the groups of the entity areas, a group activity performed by the persons therein based on a result of a voting scheme.

20 Claims, 6 Drawing Sheets

(51) Int. Cl.
*G06N 3/08* (2006.01)
*G06T 7/62* (2017.01)
*G06T 11/20* (2006.01)
*G06F 17/16* (2006.01)

(52) U.S. Cl.
CPC ............... *G06T 7/62* (2017.01); *G06T 11/20* (2013.01); *G06T 2207/10024* (2013.01); *G06T 2207/20081* (2013.01); *G06T 2207/20084* (2013.01)

(58) Field of Classification Search
CPC .. G06K 9/6268; G06K 9/6267; G06K 9/6292; G06K 9/6221; G06K 9/6226
See application file for complete search history.

(56) References Cited

OTHER PUBLICATIONS

Kim et al., "Edge-Labeling Graph Neural Network for Few-shot Learning", CVPR 2019, May 2019, pp. 1-10.
Choi et al., "Discovering Groups of People in Images", ECCV 2014, pp. 1-26.
Kahn, "Multi-Person Tracking Based on Faster R-CNN and Deep Appearance Features", available at: https://www.intechopen.com/online-first/multi-person-tracking-based-on-faster-r-cnn-and-deep-appearance-features, pp. 1-21, May 2019.
Bianchini et al., "Recursive neural networks for processing graphs with labelled edges: theory and applications", Elsevier, Neural Networks, 18 (2005), pp. 1040-1050.

* cited by examiner

SEMI-SUPERVISED GROUPING AND CLASSIFYING GROUPS FROM IMAGES

BACKGROUND

The present invention generally relates to machine learning, and more particularly to a semi-supervised method for grouping and classifying groups of people from images.

To understand social scenes, it is important to know which individuals are interacting with others, i.e., which individuals are forming groups. However, identifying people belonging to the same group as well as identifying their activities are not trivial tasks. Hence, there is a need for ways to identify the preceding in an efficient and expedient manner.

SUMMARY

According to an aspect of the present invention, a semi-supervised computer-implemented method for group and group activity detection is provided. The method includes detecting, by a hardware processor, entity areas in an image. The method further includes extracting relative position features from pairs of the entity areas. The method also includes extracting pixel features from the pairs of the entity areas. The method additionally includes combining the relative position features and the pixel features to generate edge features. The method further includes identifying, using a display device, groups formed from the entity areas by processing the edge features using an Edge-Labeling Graph Neural Network. The method also includes identifying, using the display device, for each of the groups of the entity areas, a group activity performed by the persons therein based on a result of a voting scheme.

According to another aspect of the present invention, a computer program product is provided for group and group activity detection. The computer program product includes a non-transitory computer readable storage medium having program instructions embodied therewith. The program instructions are executable by a computer to cause the computer to perform a semi-supervised method. The method includes detecting entity areas in an image. The method further includes extracting relative position features from pairs of the entity areas. The method also includes extracting pixel features from the pairs of the entity areas. The method additionally includes combining the relative position features and the pixel features to generate edge features. The method further includes identifying, using a display device, groups formed from the entity areas by processing the edge features using an Edge-Labeling Graph Neural Network. The method also includes identifying, using the display device, for each of the groups of the entity areas, a group activity performed by the persons therein based on a result of a voting scheme.

According to yet another aspect of the present invention, a computer processing system is provided for determining command-to-process correspondence. The computer processing system includes a memory device including program code stored thereon. The computer processing system further includes a hardware processor, operatively coupled to the memory device, and configured to run the program code stored on the memory device to detect entity areas in an image. The hardware processor is further configured to run the program code to extract relative position features from pairs of the entity areas. The hardware processor is also configured to run the program code to extract pixel features from the pairs of the entity areas. The hardware processor is further configured to run the program code to combine the relative position features and the pixel features to generate edge features. The hardware processor is also configured to run the program code to identify, using a display device, groups formed from the entity areas by processing the edge features using an Edge-Labeling Graph Neural Network. The processor is additionally configured to run the program code to identify, using the display device, for each of the groups of the entity areas, a group activity performed by the persons therein based on a result of a voting scheme.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to a semi-supervised method for grouping and classifying groups of people from images. While one or more embodiments are described with respect to RGB images, the present invention can be used with other types of images.

One or more embodiments of the present invention can identify groups and group activities from RGB images. Exemplary applications relating to the same include, but are not limited to, blind person navigation (e.g., identify groups of people so the blind person can avoid cutting through the groups of people), surveillance, marketing, and so forth.

One or more embodiments of the present invention can group individuals as well as estimate the number of groups and their activities in a single pass.

One or more embodiments of the present invention can handle multiple groups in a single image and also handle individuals (i.e., persons not part of a group).

One or more embodiments of the present invention are readily extended to add other output branches if needed such as, for example, but not limited to, individual activities and so forth. These and other extensions of the present invention are readily determined by one of ordinary skill in the art given the teachings of the present invention provided herein.

One or more embodiments involve the concatenation of person-wise features and relative position features as edge features in the EGNN for this task.

Figure 1:
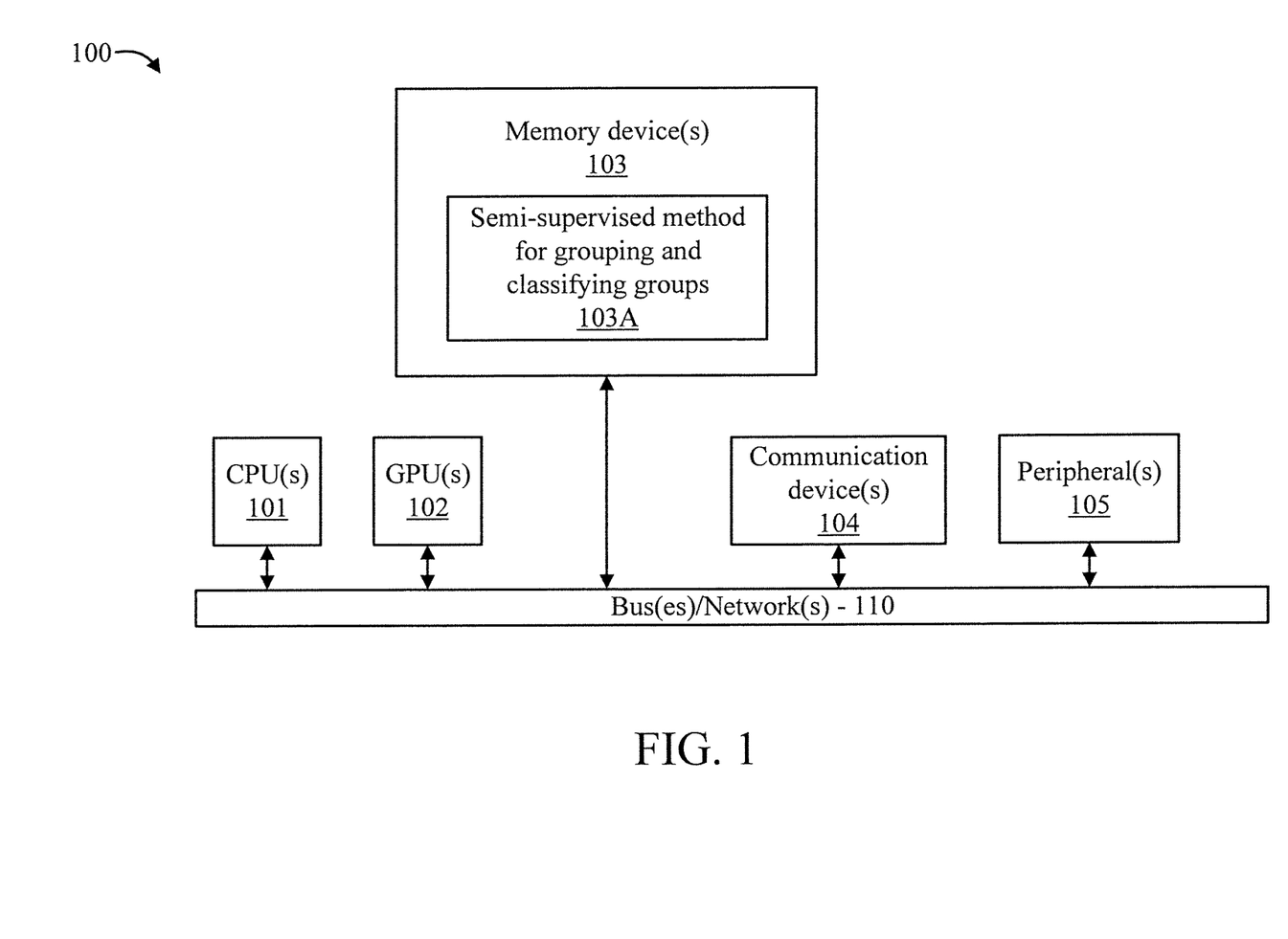
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In an embodiment, the memory devices 103 include a semi-supervised method 103A for grouping and classifying groups of people. The method 103A can include an image processing pipeline for processing an image to determine groups therein and group activities.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 4-5). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
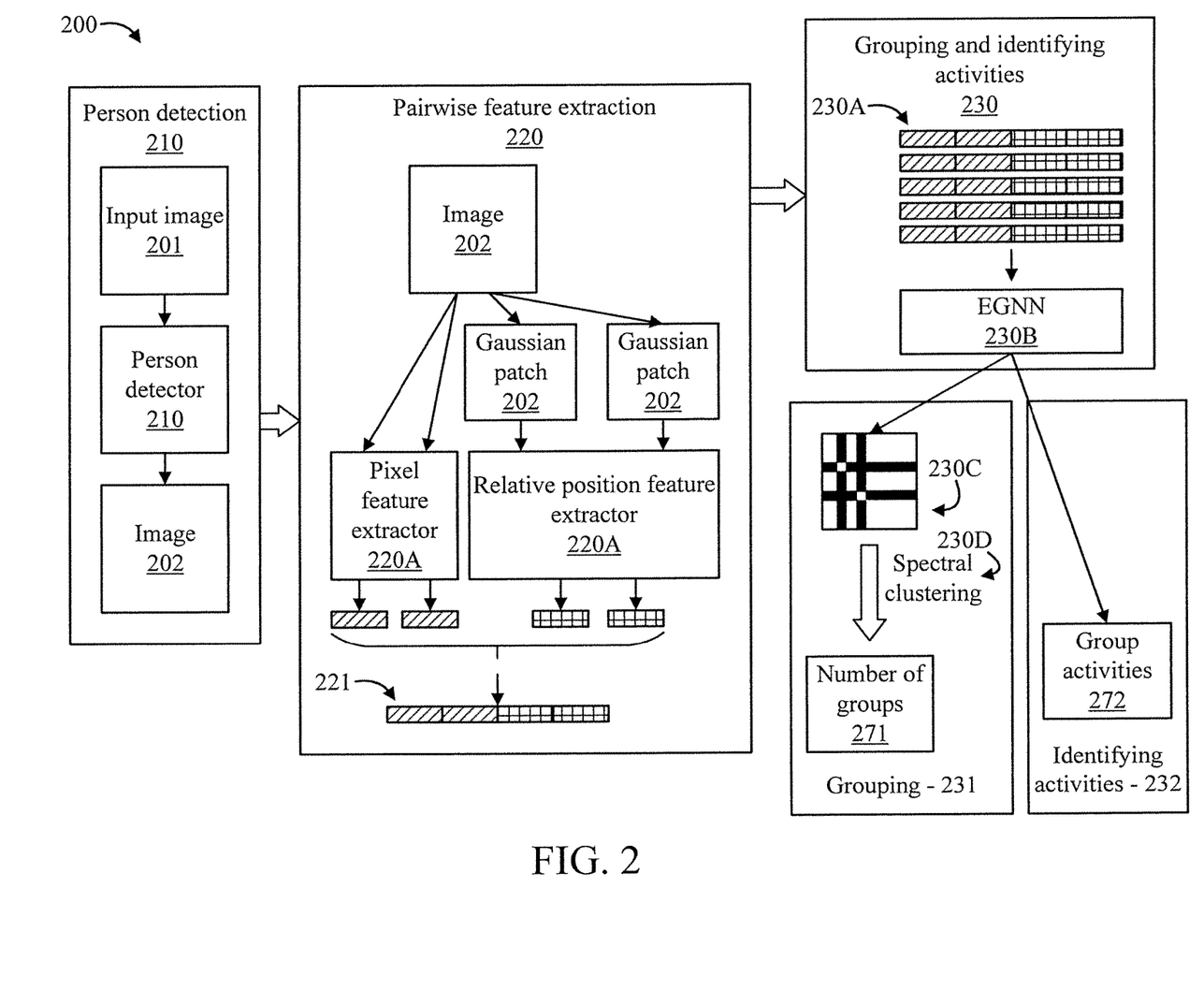
FIG. 2 is a block diagram showing an exemplary system for identifying groups and group activities, in accordance with an embodiment of the present invention.

FIG. 2 is a block diagram showing an exemplary system 200 for identifying groups and group activities, in accordance with an embodiment of the present invention.

The system includes a person detection portion 291, a pairwise feature extraction portion 292, and a grouping and identifying activities portion 293.

The pairwise feature extraction component 292 includes a person detector 210. The pairwise feature extraction portion 292 includes a pairwise feature extractor 220. The grouping and activity identification portion 230 includes a grouping and activity identification component 230.

The person detector 210 detects N people (e.g., using bounding boxes) in an input RBG image 201 in the form of an image 202 with N person areas (e.g., the bounding boxes) in which a respective person is present.

The pairwise feature extractor 220 includes a pixel feature extractor 220A and a relative position feature extractor 220B. The pixel feature extractor 220A extracts pixel features from image 202 with the N person areas (e.g., the bounding boxes) in the RGB image. In this way, processing of the entire image is avoided. In particular, each bounding box is used to derive a Gaussian patch that is input to the relative position feature extractor 220B and each bounding box is also input to the pixel feature extractor. In this way, pairwise features of pixel features and relative position features can be extracted.

To compute the relative position feature between any two person detections (i.e., two bounding boxes), the following is performed:

(1) find the relative position of bounding box 2 with respect to bounding box 1;

(2) create a new image patch and put a Gaussian patch at the corresponding relative position; and (3) use this new image patch as the input to the relative position feature extractor.

For example, we might take the centers of the two bounding boxes, compute their difference as the relative position, then create a new image patch and put a Gaussian patch with the center at the relative position on that image patch. This image patch is then used as the input to the relative position feature extractor. Note that, here, the centers of the two bounding boxes is only an example, and we could include other information, e.g. size and scale of the boxes, to compute the relative position.

The pairwise feature extractor 220 generates an image with patches of Gaussian representing relative position features. The relative position feature extractor 220B extracts relative position features from the image with the patches of Gaussian.

The pairwise feature extractor 220 concatenates the pixel features and the relative position features to generate edge features 221.

The grouping and activity identification component 230 includes a grouping portion 231 and an activity identification portion 232. The grouping and activity identification component 230 inputs $N^2$ feature vectors 230A corresponding to the edge features into an Edge-Labeling Graph Neural Network (EGNN) 230B to identify (i) a number of groups 271 and (ii) group activities 272 of the groups. While an EGNN is used in one or more embodiments of the present invention, in other embodiments, other types of machine learning mechanisms can be used while maintaining the spirit of the present invention.

In further detail regarding the grouping portion 231, an affinity matrix 230C output from the EGNN 230B indicates persons likely belonging to the same group. Once the affinity matrix 230C is obtained, a Laplacian matrix is computed from the affinity matrix. Spectral clustering 230D is then applied on the Laplacian matrix, where the number of groups 270 is estimated as the number of small eigenvalues (e.g., below a threshold amount) of the Laplacian matrix.

In further detail regarding the activity identification portion 232, the same uses the number of groups output from the grouping portion 231 to perform voting to determine a group activity 272. For each group obtained from portion 231, the group activity is estimated by a voting procedure, e.g., as the group activity that receives the highest probability from the mean of person-wised group activity prediction probabilities from portion 230B (note that, as mentioned hereinabove, portion 230B outputs both affinity matrix and person-wised group activity prediction probability) for all the persons in that group.

One or more embodiments of the present invention involve one or more loss functions. In an embodiment, the present invention uses an overall loss function corresponding to a combination of an affinity matrix loss and a person-wised group activity prediction loss. The affinity matrix loss $\mathcal{L}_{aff\_mat}$ penalizes the difference between the estimated affinity matrix and its ground truth. The affinity matrix loss forces the system to learn to predict affinity matrix 230C. The group activity loss $\mathcal{L}_{act}$ penalizes the difference between the estimated person-wised group activity prediction probability and its ground truth. The group activity loss forces the system to learn to predict the probability of each person performing a group activity.

In an embodiment, the overall loss function can be calculated as follows:

$$\mathcal{L}_\theta = \mathcal{L}_{aff\_mat} + \lambda \mathcal{L}_{act}.$$

Thus, the overall loss is determined from an affinity matrix loss $\mathcal{L}_{aff\_mat}$, a group activity loss $\mathcal{L}_{act}$, and an adjustable weight parameter $\lambda$.

In an embodiment, the affinity matrix loss can be calculated as follows:

$$\mathcal{L}_{aff\_mat} = \Sigma_{ij} d(a_{ij}^{gt}, A_{ij}^{output}),$$

where ij denotes a labeled pair of person areas, d denotes a loss function (e.g., cross-entropy function), $a_{ij}^{gt}$ denotes the entry ij of the ground truth affinity matrix, and $A_{ij}^{output}$ denotes the entry ij of the estimated affinity matrix 230C.

In an embodiment, the group activity loss can be calculated as follows:

$$\mathcal{L}_{act} = \Sigma_i d(y_i^{gt}, y_i^{output}),$$

where i denotes the person i in image 202, $y_i^{gt}$ denotes ground truth group activity of the person i, and $y_i^{output}$ denotes the estimated group activity probability obtained from the output of portion 230B.

Embodiments of the present invention differ from fully supervised prior art approaches as fully supervised prior art approaches require all nodes to be labeled, while the present invention can operate in a semi-supervised manner by simply imposing the affinity matrix loss and the group activity loss only on nodes which are labeled.

Figure 3:
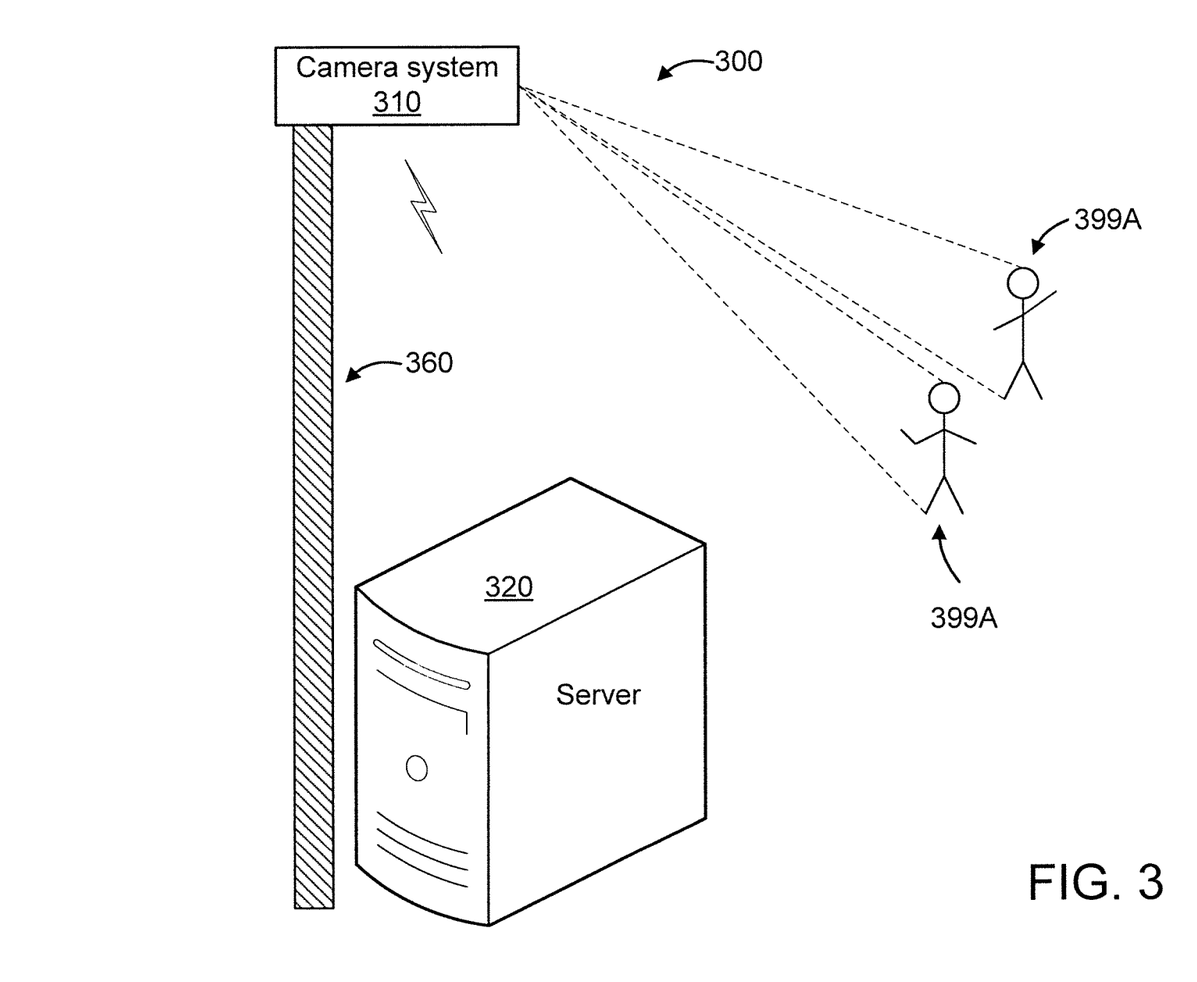
FIG. 3 is a block diagram showing an exemplary system for identifying groups and group activities, in accordance with an embodiment of the present invention.

FIG. 3 is a block diagram showing an exemplary system 300 for identifying groups and group activities, in accordance with an embodiment of the present invention;

The system 300 includes a camera system 310. While a single camera system 310 is shown in FIG. 3 for the sakes of illustration and brevity, it is to be appreciated that multiple camera systems can be also used, while maintaining the spirit of the present invention.

In the embodiment of FIG. 3, the camera system 310 is mounted on a mounting entity 360. For the sake of illustration, the mounting entity 360 is a pole. While a pole 360 is shown (as a mounting entity) for the sake of illustration, any other mounting entity can be used, as readily appreciated by one of ordinary skill in the art given the teachings of the present invention provided herein, while maintaining the spirit of the present invention. For example, the camera system 310 can be mounted in or on any of the following: a building; and so forth. The preceding examples are merely illustrative.

The camera system 310 can be a wireless camera system having its own antenna(s) or can use one or more antennas included on the pole 360 (or other mounting entity (e.g., building, drone, etc.) to which the camera system 310 is mounted or proximate).

The system 300 further includes a server 320 configured to perform group classification in, e.g., a facility or other environment. The server 320 can be located remote from, or proximate to, the camera system 310.

Accordingly, some exemplary suitable environments to which the present invention can be applied can include any environments where group classification and group action classification can prove useful such as mass transit hubs, border crossings, subways, transportation hubs, airports, ship ports, sports facilities, and so forth. It is to be appreciated that the preceding environments are merely illustrative and, thus, other environments can also be used, while maintaining the spirit of the present invention.

Any action type of interest can be recognized, depending upon the implementation. For example, the action may include, but is not limited to, one or more of the following: an intruder running up to a premises or an object; a sporting action; a prohibited action (e.g., holding a weapon in a place where weapons are prohibited except for, e.g., law enforcement, etc.); a potentially dangerous action; and so forth. It is to be appreciated that the preceding actions are merely illustrative.

Figure 4:
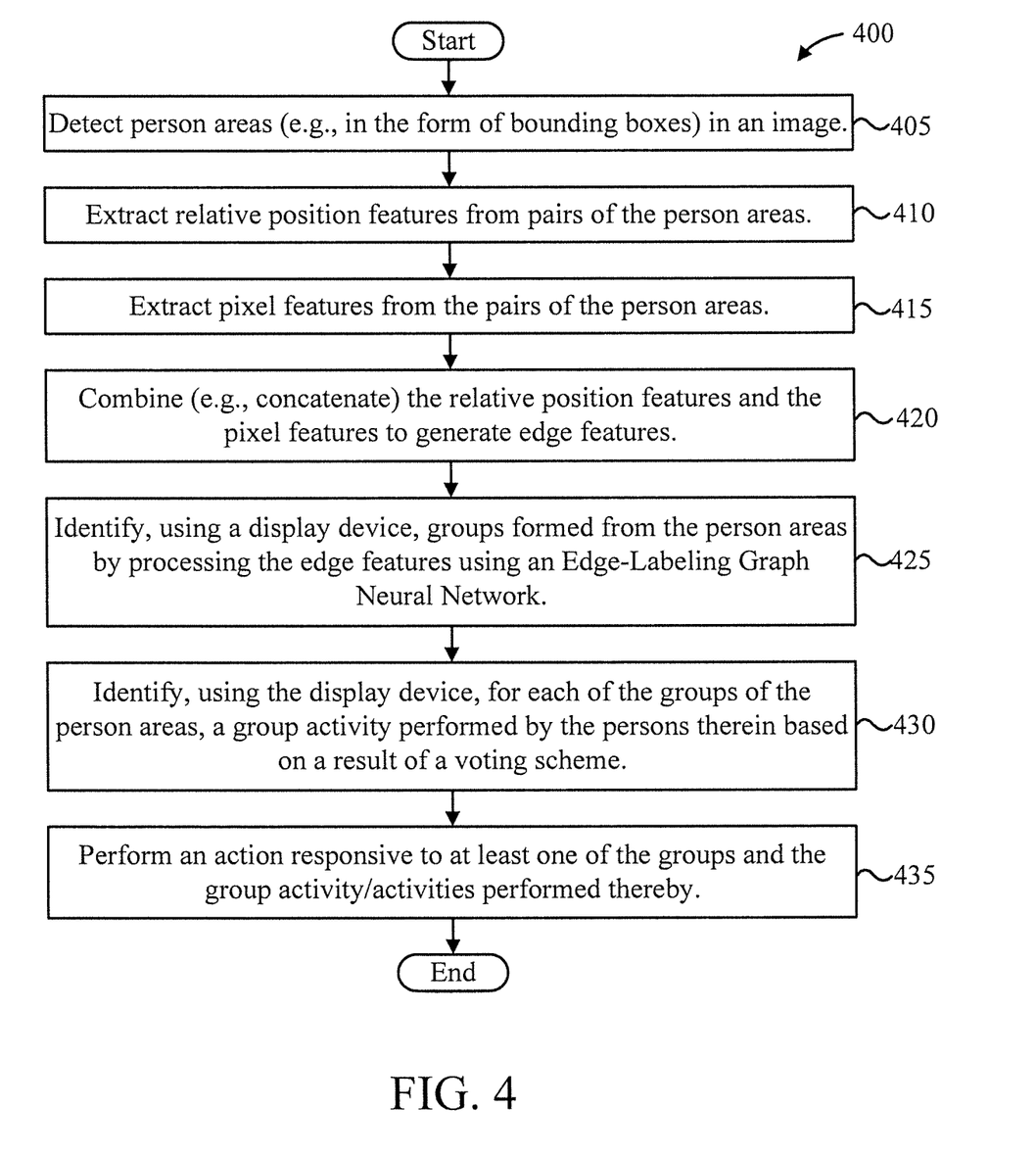
FIG. 4 is a flow diagram showing an exemplary semi-supervised method for grouping and classifying groups of people from an image, in accordance with an embodiment of the present invention.

FIG. 4 is a flow diagram showing an exemplary semi-supervised method 400 for grouping and classifying groups of people from an image, in accordance with an embodiment of the present invention. In an embodiment, at least part of method 400 can be performed using cloud technology (see, e.g., FIGS. 5-6). For example, in an embodiment, an image is submitted to the cloud, which processes the image to output the groups (e.g., numbers of groups) and the activities performed by the groups to, e.g., a remote computer (e.g., a user device such as a mobile phone, a computer, a tablet, etc.). In this way, processing is offloaded from the user device. In other embodiments, the method 400 is performed in a non-cloud based environment. These and other variations and implementations of method 400 are readily determined by one of ordinary skill in the art given the teachings of the present invention provided herein.

At block 405, detect person areas (e.g., in the form of bounding boxes) in an image.

At block 410, extract relative position features from pairs of the person areas. It is noted that relative position is exploited by method 400 instead of absolute position.

At block 415, extract pixel features from the pairs of the person areas.

At block 420, combine (e.g., concatenate) the relative position features and the pixel features to generate edge features.

At block 425, identify, using a display device, groups formed from the person areas by processing the edge features using an Edge-Labeling Graph Neural Network.

At block 430, identify, using the display device, for each of the groups of the person areas, a group activity performed by the persons therein based on a result of a voting scheme.

At block 435, perform an action responsive to at least one of the groups and the group activity/activities performed thereby. Exemplary actions are described herein. For example, in an embodiment, the person areas can be localized based on the edge features to provide group edge information, and navigation directions provided to a user for blind person navigation responsive to the group edge information. In another embodiment relating to surveillance, at least one of the groups can be confined in a confinement area responsive to the group activity being a criminal activity. In another embodiment, the identified groups can be used to form sports teams where the natural inclination for people to group together is used as the basis for team formation. These and other actions that can be performed are readily determined by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
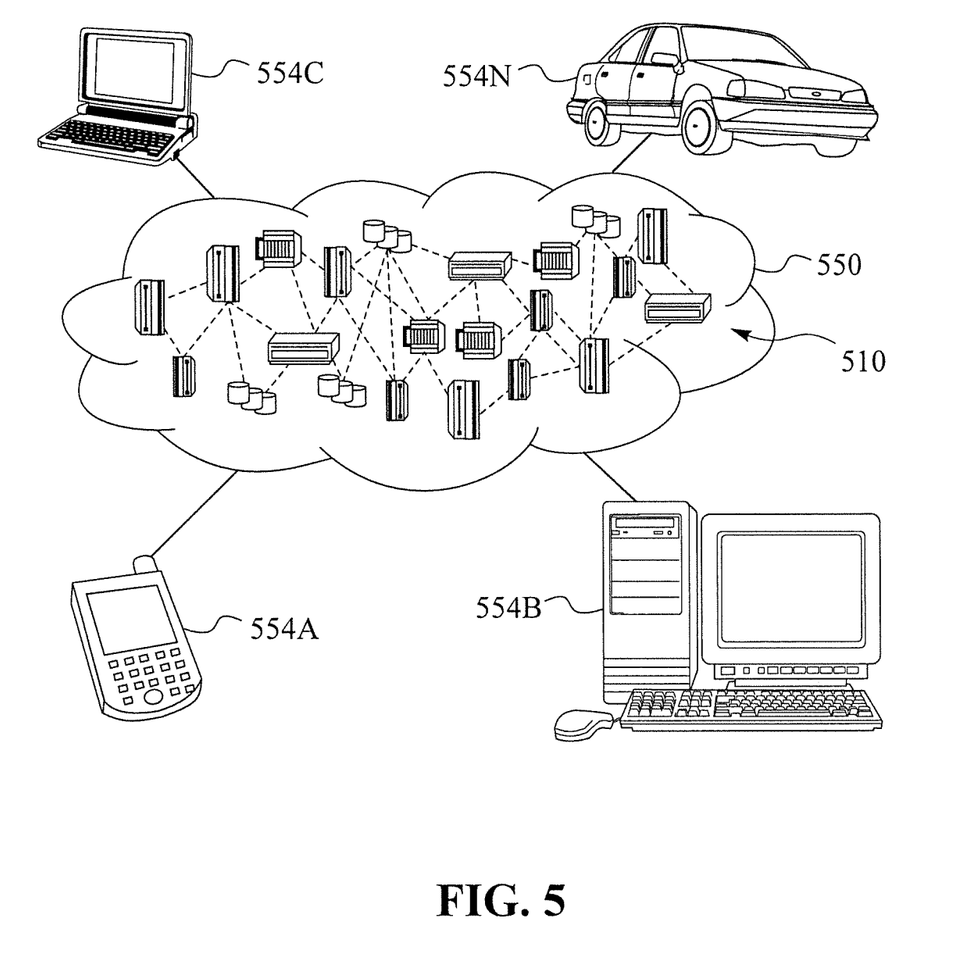
FIG. 5 is a block diagram showing an illustrative cloud computing environment having one or more cloud computing nodes with which local computing devices used by cloud consumers communicate, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
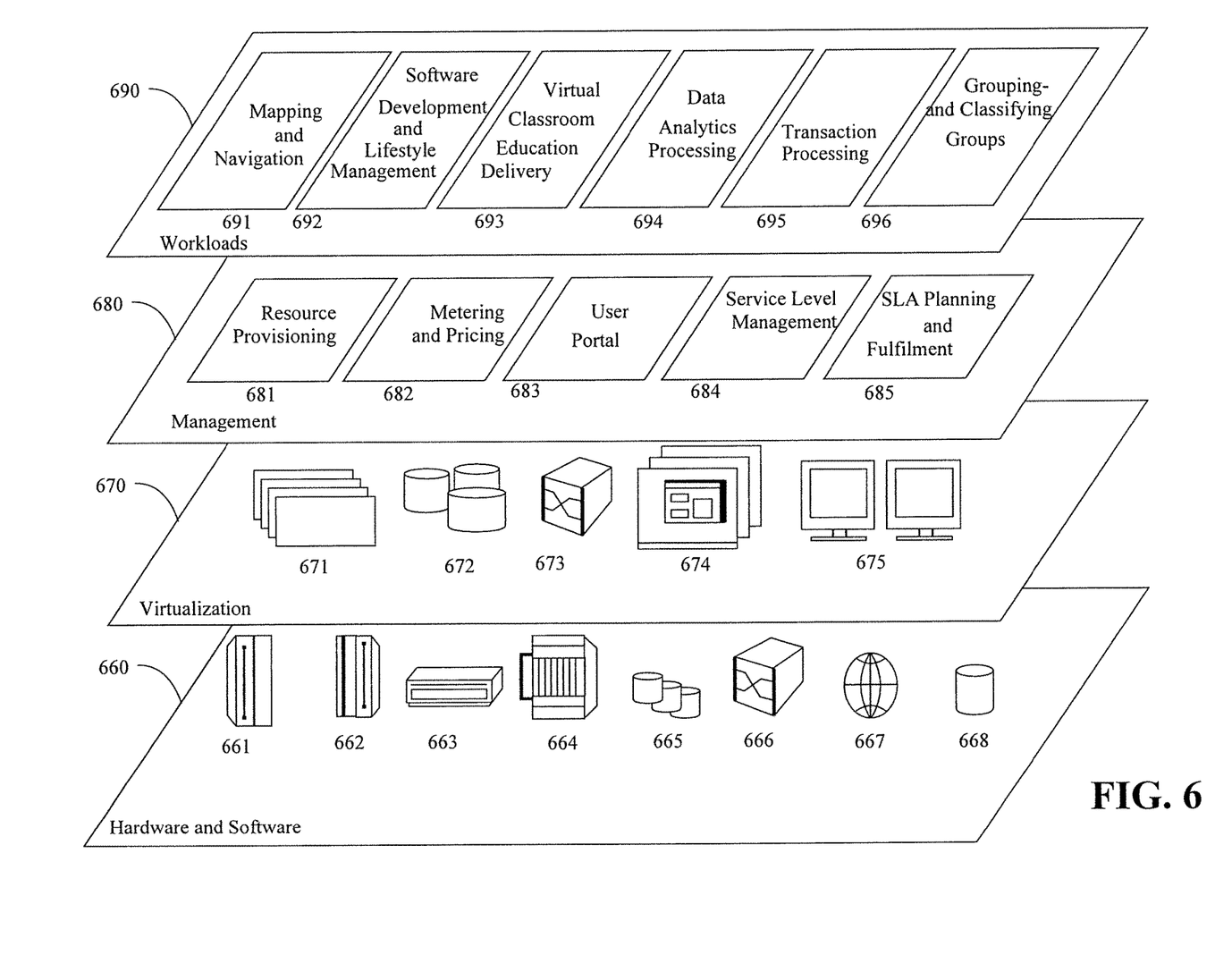
FIG. 6 is a block diagram showing a set of functional abstraction layers provided by a cloud computing environment, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and group and group activity classification 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A semi-supervised computer-implemented method for group and group activity detection, comprising:
    detecting, by a hardware processor, entity areas in an image;
    extracting relative position features from pairs of the entity areas;
    extracting pixel features from the pairs of the entity areas;
    combining the relative position features and the pixel features to generate edge features;
    identifying, using a display device, groups formed from the entity areas by processing the edge features using an Edge-Labeling Graph Neural Network; and
    identifying, using the display device, for each of the groups of the entity areas, a group activity performed by the persons therein based on a result of a voting scheme.

2. The semi-supervised computer-implemented method of claim 1, wherein said identifying steps are performed concurrently.

3. The semi-supervised computer-implemented method of claim 1, wherein the method is performed in a single pass.

4. The semi-supervised computer-implemented method of claim 1, further comprising:
    localizing the entity areas based on the edge features to provide group edge information; and
    providing navigation directions to a user for blind person navigation responsive to the group edge information.

5. The semi-supervised computer-implemented method of claim 1, further comprising containing at least one of the groups in a confinement area responsive to the group activity being a criminal activity.

6. The semi-supervised computer-implemented method of claim 1, wherein the entity areas are in a form of bounding boxes.

7. The semi-supervised computer-implemented method of claim 1, wherein the image is a RGB image.

8. The semi-supervised computer-implemented method of claim 1, wherein said step of identifying groups comprises identifying a number of groups and members of the groups.

9. The semi-supervised computer-implemented method of claim 1, wherein said identifying steps concurrently output multiple groups and multiple group activities corresponding thereto in a single pass.

10. The semi-supervised computer-implemented method of claim 1, wherein said combining step concatenates the relative position features and the pixel features to generate the edge features.

11. The semi-supervised computer-implemented method of claim 1, further comprising:
generating an affinity matrix using the Edge-Labelling Neural Network; and
determining group membership of persons in the entity areas based on the affinity matrix.

12. The semi-supervised computer-implemented method of claim 11, further comprising identifying a number of groups based on Eigenvalues of a Laplacian matric generated from the affinity matrix being below a threshold value.

13. A computer program product for group and group activity detection, the computer program product comprising a non-transitory computer readable storage medium having program instructions embodied therewith, the program instructions executable by a computer to cause the computer to perform a semi-supervised method comprising:
detecting entity areas in an image;
extracting relative position features from pairs of the entity areas;
extracting pixel features from the pairs of the entity areas;
combining the relative position features and the pixel features to generate edge features;
identifying, using a display device, groups formed from the entity areas by processing the edge features using an Edge-Labeling Graph Neural Network; and
identifying, using the display device, for each of the groups of the entity areas, a group activity performed by the persons therein based on a result of a voting scheme.

14. The computer program product of claim 13, wherein said identifying steps are performed concurrently.

15. The computer program product of claim 13, wherein the method is performed in a single pass.

16. The computer program product of claim 13, wherein said identifying steps concurrently output multiple groups and multiple group activities corresponding thereto in a single pass.

17. The computer program product of claim 13, wherein said combining step concatenates the relative position features and the pixel features to generate the edge features.

18. The computer program product of claim 13, further comprising:
generating an affinity matrix using the Edge-Labelling Neural Network; and
determining group membership of persons in the entity areas based on the affinity matrix.

19. The computer program product of claim 18, further comprising identifying a number of groups based on Eigenvalues of a Laplacian matric generated from the affinity matrix being below a threshold value.

20. A computer processing system for determining command-to-process correspondence, comprising:
a memory device including program code stored thereon;
a hardware processor, operatively coupled to the memory device, and configured to run the program code stored on the memory device to
detect entity areas in an image;
extract relative position features from pairs of the entity areas;
extract pixel features from the pairs of the entity areas;
combine the relative position features and the pixel features to generate edge features;
identify, using a display device, groups formed from the entity areas by processing the edge features using an Edge-Labeling Graph Neural Network; and
identify, using the display device, for each of the groups of the entity areas, a group activity performed by the persons therein based on a result of a voting scheme.

* * * * *